Dec. 26, 1950     A. J. GERBER     2,535,493
BEVERAGE BOTTLE CASE

Filed April 22, 1946     2 Sheets-Sheet 1

INVENTOR
ALBERT J. GERBER

ATTORNEY

Dec. 26, 1950      A. J. GERBER      2,535,493
BEVERAGE BOTTLE CASE

Filed April 22, 1946      2 Sheets-Sheet 2

INVENTOR
ALBERT J. GERBER
By Alfred W Petchaft
ATTORNEY

Patented Dec. 26, 1950

2,535,493

UNITED STATES PATENT OFFICE 2,535,493

BEVERAGE BOTTLE CASE

Albert J. Gerber, University City, Mo., assignor, by mesne assignments, to Beverage Sales Co., St. Louis, Mo., a corporation of Missouri Application April 22, 1946, Serial No. 663,997

2 Claims. (Cl. 220—97)

This invention relates in general to certain new and useful improvements in beverage bottle cases.

The present invention has for its primary object the provision of a uniquely designed unitary beverage bottle case or container molded as an integral or unitary structure from suitable plastic material.

It is also an object of the present invention to provide molded plastic beverage bottle cases which will stack or nest compactly one upon the other when empty and similarly can be stacked securely in interlocking or so-called "cross-stacked" relationship when filled.

It is an additional object of the present invention to provide a beverage bottle case or container molded of plastic having an extremely high impact strength and so designed as to provide maximum structural strength.

It is a further object of the present invention to provide a beverage bottle case or container which is extremely rugged and durable and is relatively light-weight and compact in size.

It is another object of the present invention to provide a unitary or "one-piece" beverage bottle case or container which is substantially waterproof and will, therefore, not swell or rot or otherwise deteriorate under conditions of actual use.

And with the above and other objects in view, my invention resides in the novel features of form, construction, arrangement, and combination of parts presently described and pointed out in the claims.

In the accompanying drawings.

Figure 1:
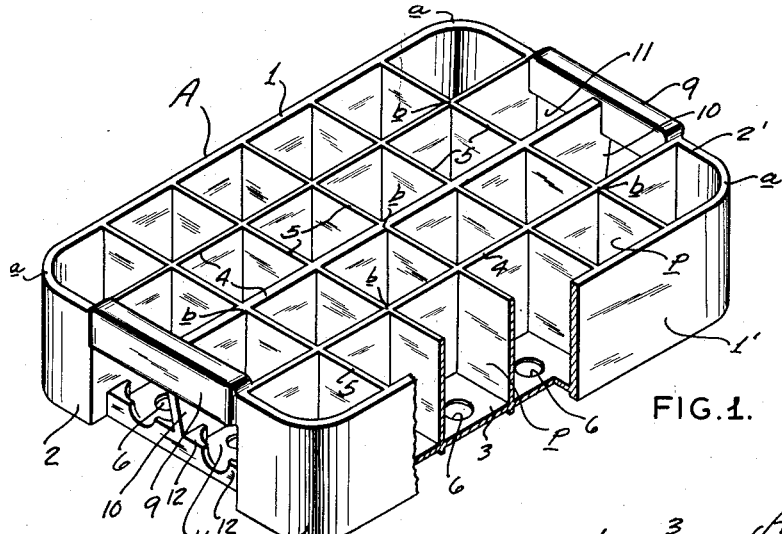
Figure 1 is a perspective view, partly broken away and in section, of a beverage bottle case constructed in accordance with and embodying the present invention.
Figure 2:
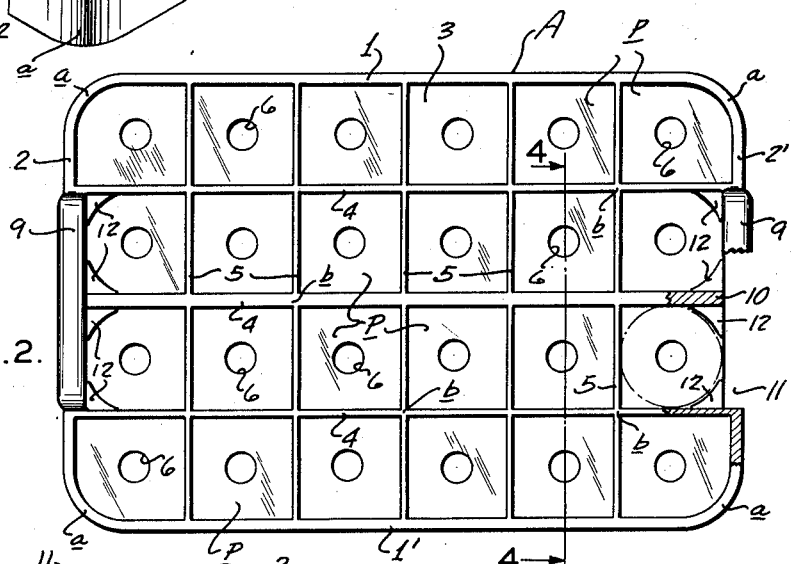
Figure 2 is a top plan view, partly broken away and in section, of the beverage bottle case.

Referring now in more detail and by reference characters to the drawings, which illustrate preferred embodiments of the present invention, A designates a beverage bottle case constructed in accordance with and embodying my present invention and comprises a unitary or "one-piece" structure molded of plastic material. The case A unitarily comprises four rectangularly arranged side walls 1, 1' and end walls 2, 2', endwise integrally connected by rounded corner sections $a$ and being further integrally connected along their lower margins by a bottom wall 3. Between the walls 1, 1', 2, 2', and above the bottom wall 3, the container A is provided with a plurality of longitudinal and transverse vertical partitions 4, 5, all integrally connected to each other at their several points of intersection, as at $b$, and likewise integrally connected along the bottom margins to the upper face of the bottom wall 3 in the formation of a plurality of bottle-receiving compartments or pockets $p$.

Centrally of each compartment or pocket $p$, the bottom wall 3 is provided with a circular aperture 6, which extends therethrough and is diametrically enlarged upon the under face of the bottom wall 3 to provide a socket or recess 7 of sufficient size to loosely accommodate a bottle cap $c$. The particular embodiment shown in the drawings is a twenty-four bottle case; therefore, there will be twenty-four pockets $p$ and, similarly, twenty-four such apertures 6 in the bottom wall 3. The bottom wall 3 is further provided with a plurality of rectilinearly arranged narrow webs $w$ flush with the downwardly presented face of a marginal rib $r$, the webs $w$ and ribs $r$ being more or less aligned continuations, respectively, of the side and end walls 1, 2 and the partitions 5.

Formed upon the outer faces of the end walls 2, 2', midway between the corners $a$, and adjacent the upper margin thereof, are outwardly and upwardly projecting handles 9, and, at its mid-point, each handle is provided with a central web 10 which extends inwardly and becomes an integral continuation of the central longitudinal partitions 4. The end walls 2, 2', of the case A are cut away below the handles 9 in the formation of side wall apertures 11 which, in conjunction with the apertures 6 of the bottom wall 3, provide for complete and free drainage of any water which may tend to accumulate in the bottom of the case A. Also formed integrally upon the upper face of the bottom wall 3, adjacent the exposed margins of the two end pockets p which open through the side wall aperture 11, are upstanding arcuate stop-blocks 12 to prevent the bottles in such pockets p from slipping through the apertures 11.

Figures 3, 4:
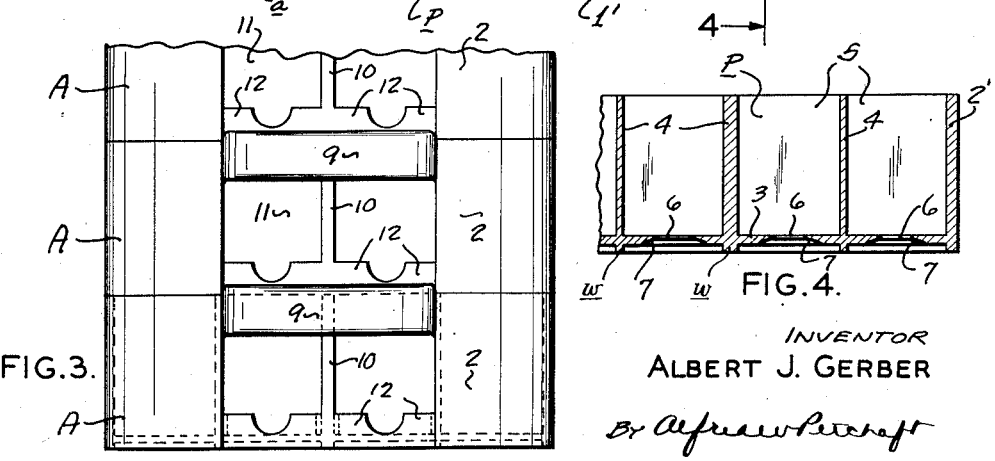
Figure 3 is an end elevational view of a plurality of beverage bottle cases illustrating the unique manner in which such beverage bottle cases may be stacked.
Figure 4 is a fragmentary vertical sectional view of the beverage bottle case taken along the line 4—4 of Figure 2.
Figure 5:
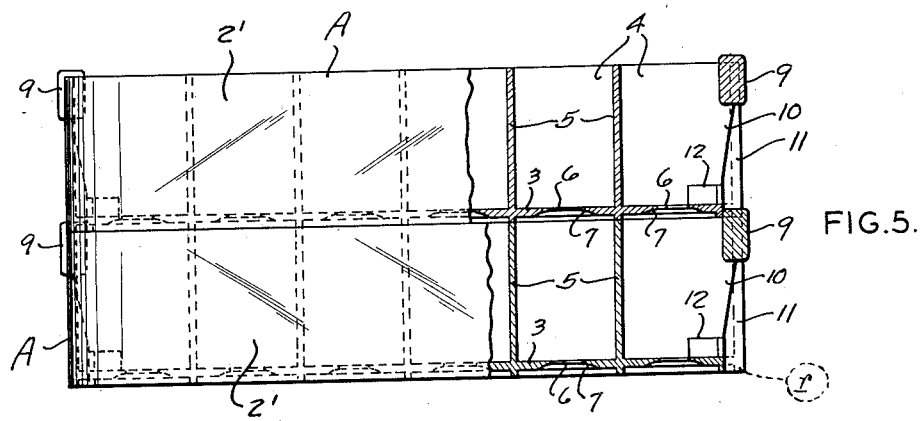
Figure 5 is a side elevational view, partly broken away and in section, showing two beverage bottle cases in superposed or stacked relation.
Figure 6:
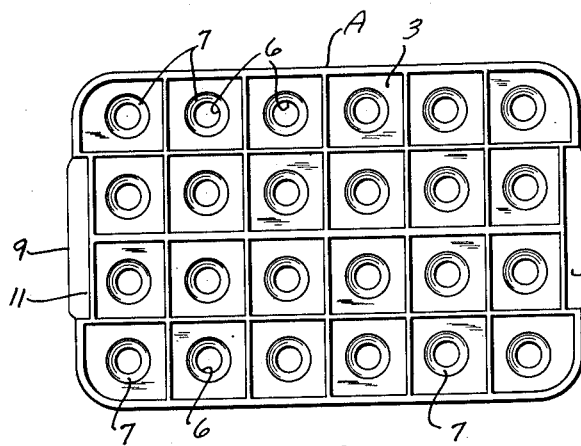
Figure 6 is a bottom plan view of the beverage bottle case.
Figure 7:
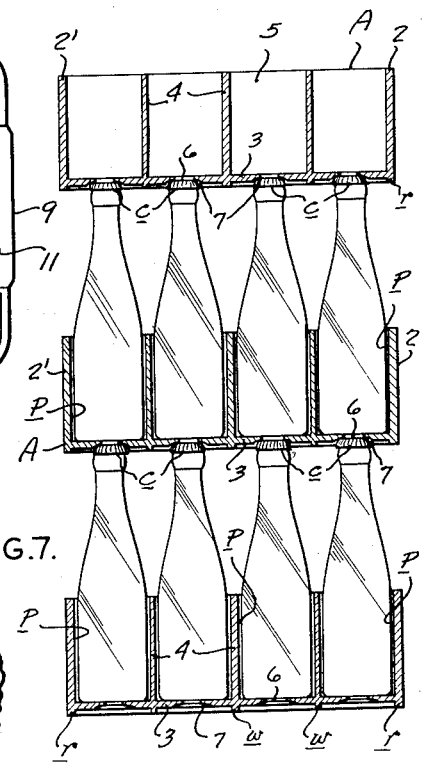
Figure 7 is a sectional view of a plurality of beverage bottle cases containing bottles and superposed one upon the other in stacked relation.
Figure 8:
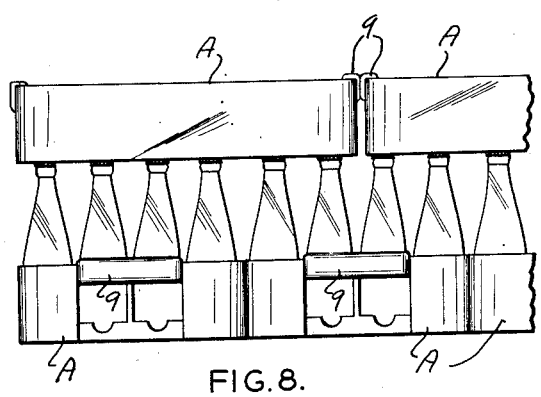
Figure 8 is a fragmentary side elevational view of a plurality of beverage bottle cases containing beverage bottles and illustrating the unique manner in which a plurality of such beverage bottle cases may be cross-stacked.

In addition, the horizontal width of the aperture 11 is slightly greater than the corresponding dimension of the handle 9. Thus, when a plurality of empty cases A are stacked for storage, the handles 9 of one case A will fit neatly in the bottom of the aperture 11 of the case A next above, as shown in Figure 3. Similarly, when the cases A are filled with bottles the caps c of the bottles in one case A will nest in the recesses 7 formed in the bottom wall 3 of the case A next above, as shown in Figure 7. Finally, due to unique dimensional arrangement, the bottle-filled cases are capable of being stacked in superposed alignment as shown in Figure 7, or cross-stacked as shown in Figure 8, where a large multi-tiered pile of cases is to be formed.

The case or container A, designed as above described, may be molded in a single unitary operation from a suitable plastic mix containing long shredded fibrous material which results in a container having extremely high impact strength. It will also be apparent that beverage bottle containers constructed in accordance with the present invention are extremely light-weight and, therefore, can be much more easily handled by delivery men and other persons connected with the handling, sale, and distribution of carbonated beverages.

Beverage bottle cases constructed in accordance with the present invention will stack well, both when empty and when filled. Finally, by reason of the use of molded materials, the beverage bottle case is entirely waterproof and will not swell, rot, or deteriorate, as will all the conventional wooden cases, when continuously subjected to the damp, wet conditions ordinarily encountered in actual use.

It should be understood that changes and modifications in the form, construction, arrangement, and combination of the several parts of the beverage bottle case may be made and substituted for those herein shown and described without departing from the nature and principle of my invention.

Having thus described my invention, what I claim and desire to secure by Letters Patent is:

1. A beverage bottle case having unitary side, end, and bottom walls, said side walls being provided in their upper central portion with projecting rectilinear handle elements, said side walls being entirely cut away beneath said handle elements in the provision of side wall apertures, said apertures having a transverse width slightly greater than the length of the handle elements so that when two empty cases are stacked, one upon the other, the handle elements of one case will enter the cut-away area of the other case, and stop members having upstanding planar surfaces, said stop members being disposed inwardly of the cut-away area and extending the width thereof.

2. A beverage bottle case comprising integrally interconnected side, end, and bottom walls having a plurality of integrally interconnecting spaced parallel partitions extending longitudinally and transversely so as to divide the case into a plurality of rectangular cells for receiving beverage bottles, one of said longitudinally extending partitions being disposed along the longitudinal center line of said case, said side walls being integrally provided in the central portion of their upper margins with upwardly and outwardly extending handle elements, said handle elements being secured to the adjacent portions of the end faces of said central partition, said side walls being cut away beneath said handle elements, said cut-away area having a length slightly in excess of that of the handle elements and opening into the interior of the case, and a stop member having an upstanding planar surface provided inwardly of said cut-away area and adjacent the bottom portion thereof, said stop member extending the width of said cut-away area, the end faces of said central partition inclining inwardly from the lower portion of the handle elements and merging at their lower ends into the stop member.

ALBERT J. GERBER.

REFERENCES CITED

The following references are of record in the file of this patent:

UNITED STATES PATENTS

| Number | Name | Date |
|--------|------|------|
| 586,122 | Gale | July 13, 1897 |
| 1,003,609 | Johnston | Sept. 19, 1911 |
| 1,207,279 | Crum | Dec. 5, 1916 |
| 1,771,264 | Marrits | July 22, 1930 |
| 1,782,307 | Lagasse | Nov. 18, 1930 |
| 1,809,523 | McLean | June 9, 1931 |
| 1,922,605 | Spear | Aug. 15, 1933 |
| 2,223,554 | Davis | Dec. 3, 1940 |
| 2,329,656 | Sedgwick | Sept. 14, 1943 |
| 2,364,705 | Geralds | Dec. 12, 1944 |
| 2,409,748 | Folst | Oct. 22, 1946 |
| 2,467,698 | Reynolds | Apr. 19, 1949 |